United States Patent [19]

Wiemer et al.

[11] Patent Number: 5,781,437
[45] Date of Patent: Jul. 14, 1998

[54] CONTROL SYSTEM FOR CONTROLLING VEHICLES

[75] Inventors: Karl-Heinz Wiemer, Ettlingen; Fritz-Hermann Kreft; Wolfgang Hedwig, both of Bonn; Horst Winter, Karlsruhe, all of Germany

[73] Assignee: IBP Pietzsch GmbH, Germany

[21] Appl. No.: 402,380

[22] Filed: Mar. 13, 1995

Related U.S. Application Data

[63] Continuation of Ser. No. 46,950, Apr. 15, 1993, abandoned.

[30] Foreign Application Priority Data

Apr. 21, 1992 [EP] European Pat. Off. .......... 92-106777.3
Nov. 4, 1992 [DE] Germany ................. 150195 U

[51] Int. Cl.$^6$ ...................................................... G06F 15/14
[52] U.S. Cl. .................. 364/423; 364/424.01; 340/995; 434/11; 342/176
[58] Field of Search ................ 364/423, 424.01, 364/424.02, 443, 449, 922.5, 461; 342/457, 176, 179, 180, 181; 340/988, 989, 990, 995; 434/11; 273/439; 395/902, 903, 905

[56] References Cited

U.S. PATENT DOCUMENTS

| | | | |
|---|---|---|---|
| 4,414,621 | 11/1983 | Bown et al. | 364/200 |
| 4,543,727 | 10/1985 | Wecker et al. | 33/228 |
| 4,609,358 | 9/1986 | Sangster | 434/307 |
| 4,709,265 | 11/1987 | Silverman et al. | 358/108 |
| 4,740,779 | 4/1988 | Cleary et al. | 340/705 |
| 4,746,770 | 5/1988 | McAvinney | 178/18 |
| 4,819,174 | 4/1989 | Furuno et al. | 364/444 |
| 4,994,974 | 2/1991 | Cummings | 364/443 |
| 5,024,523 | 6/1991 | Jerie | 353/11 |
| 5,119,319 | 6/1992 | Tanenbaum | 364/514 |
| 5,153,836 | 10/1992 | Fraughton et al. | 364/461 |
| 5,189,430 | 2/1993 | Yano et al. | 342/457 |
| 5,241,481 | 8/1993 | Olsén | 364/449 |
| 5,307,074 | 4/1994 | Janex | 342/41 |
| 5,307,271 | 4/1994 | Everett, Jr. et al. | 364/424.02 |
| 5,315,515 | 5/1994 | Schmitz | 364/424.01 |
| 5,381,338 | 1/1995 | Wysocki et al. | 364/449 |

FOREIGN PATENT DOCUMENTS

| | | |
|---|---|---|
| 3024330 | 1/1982 | Germany . |
| 3212729 | 10/1983 | Germany . |
| 3342338 | 9/1985 | Germany . |
| 3404202 | 5/1987 | Germany . |
| 4033832 | 6/1991 | Germany . |
| 1213685 | 8/1989 | Japan . |
| 2078914 | 6/1981 | United Kingdom . |

OTHER PUBLICATIONS

Wedlake et al., "Air Land Battle Management Program Decision Aids for Battle Management Planning," 1991 Artificial Intelligence Applications Conference, pp. 164–167.

Bumann, "Vehicle Communications in Europe", Int'l Congress on Transportation Electronics, Oct. 1988, pp. 229–235.

Salvy et al., "France–Des Solutions Originales en Matiére de Visualisation," Revue Int'l de Defense, vol. 21, 1988, No. 4, pp. 369–372.

Shneiderman, "Touch Screens Now Offer Compelling Uses", IEEE Software, vol. 8, Issue 2, Mar. 1991, pp. 93–94.

Primary Examiner—Kevin J. Teska
Assistant Examiner—Leigh Marie Garbowski
Attorney, Agent, or Firm—Rogers & Killeen

[57] ABSTRACT

A system for controlling vehicles in which stored information, information obtained from the surroundings, and information relating to the condition of components such as the position of the observation device on the vehicle are provided and communication means, means for initiating functions, and a digital command computer including a processor (21) and a main memory (22) are provided, said system being characterized in that the command computer comprises a graphics processor (23), video electronics (24), a bulk storage interface (25) with a bulk storage (26), and an interactive video screen (30) through which all of the sensed, stored outputted information in the form of digital data relating to the control, the condition and the operational situation of the vehicle is visualized.

46 Claims, 6 Drawing Sheets

CONTROL SYSTEM FOR CONTROLLING VEHICLES

This is a continuation of application Ser. No. 08/046,950, filled Apr. 15, 1993 now abandoned.

The present invention is directed to a control system for controlling vehicles in which stored information, information obtained from the environment and information related to the condition of components such as the position from the monitoring device of the vehicle is provided and in which there are provided communication means, means for initiating functions, a control unit equipped with a processor and a main memory and possibly a navigation system.

The vehicles may be civil vehicles such as those of a disaster control unit or a fire brigade or military vehicles such as fighting vehicles.

Present-day control and information means for controlling one or several vehicles of a vehicle formation or unit from a control vehicle comprise video display terminals (VDT), eyepieces, television and thermal-imaging cameras with projection screen, a navigation system, radiotelephone sets and, as auxiliary means, control units comprising a processor and a main memory. Known devices for auxiliary display and sight means are described in DE 30 24 330 C2 and in DE 32 17 729 C2.

With the help of these and other devices the controlling personnel such as the commander of a fighting vehicle has to sift and classify the incoming information and to analyze the same by means of back-up information such as charts etc. and process such information to find decisions. Lighted displays, keys and switches must be observed and operated; corner reflectors and periscope have to be used, charts must be studied, compared and updated; radio communication and internal communication have to be performed. All this will usually take most of the available time and attention of the controlling personnel.

When the commander has obtained the required information such information must be classified, selected and combined so that he may form a picture of the situation and will be enabled to put the high technical performance potential of his vehicle or the vehicles of the formation to optimal use.

When the available information and control means are made use of, the mentioned utilization is extremely limited for the reasons set out below: Transmission and processing of information and the resultant finding of a decision are too slow, and orientation relating to the present position and situation are too inaccurate. The secondary control tasks take up too much of the commander's or controlling personnel's time and attention so that there is insufficient time for the actual executive task.

Figure 1:
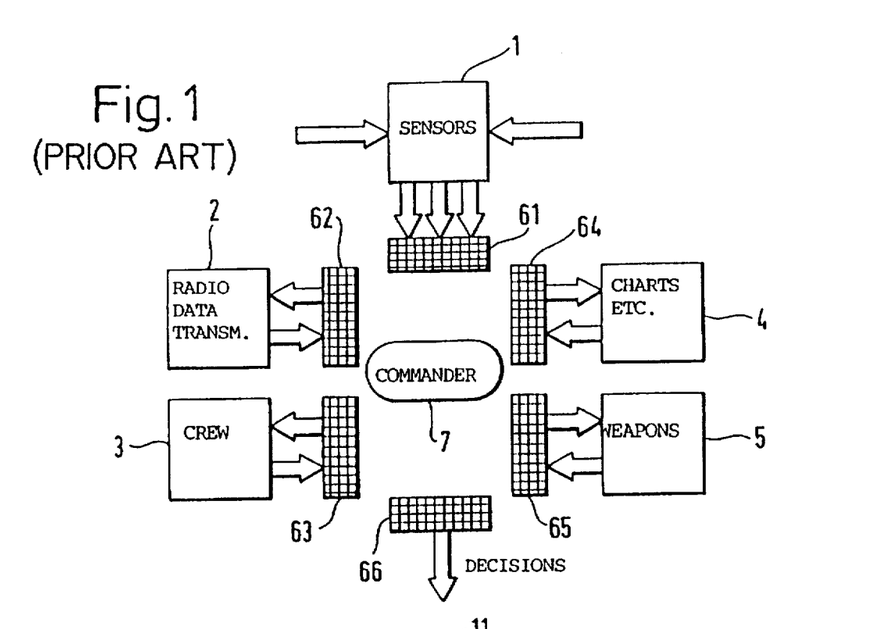
FIG. 1 is a schematic diagram of a system in accordance with the prior art.

FIG. 1 is a schematic diagram for explaining the present configuration in a fighting vehicle. In the figure, the non-hatched blocks 1 to 5 indicate, in the same order, sensors, radio set, crew, charts and weapons system, while the cross-hatched areas 61 to 65 indicate various operating and display elements, and the oval 7 indicates the commander's position FIG. 1 is illustrative of the afore-described problems encountered by the commander, who acts as the "switching center", when executing control by classifying and processing information and by subsequently finding decisions.

The present invention is based on the objective of improving a system of the above-described kind for controlling vehicles, in particular fighting vehicles, in such a way that controlling persons controlling a vehicle or a vehicle formation such as a combat team will be informed more rapidly, more accurately and more clearly and will be relieved as far as possible from information processing so as to gain precious time for the actual control tasks.

The command computer, which has hitherto been used only as an auxiliary means, is now made one of the core components of the system according to the present invention. In accordance with the invention it comprises a graphics processor, video electronics, a bulk storage interface including a bulk storage, and at least one interactive video screen by means of which all of the inputted, stored and outputted information in the form of digital data relating to the control, the condition and the operational situation of the vehicle is visualized. Every piece of information obtained from the various information sources and subsequent to processing in the graphics processor is combined for the controlling person by such visualization so that the controlling person will have to perform only a minimum of processing because he no longer has the function of an information "switching center" but rather is the user and controller of information which has been processed by the command computer and selected from the total amount of information and which is essential for the control operation.

The use of the system according to the present invention is particularly advantageous when at least two partners, i.e. a controlling or command vehicle and at least one controlled vehicle, are concerned in which case a system according to the instant invention will be provided in each vehicle of the vehicle formation. However, the system according to the present invention also offers advantages when used in only a single vehicle for controlling the same with a view to relieving the controlling person by processing and clear presentation of the information essential for control.

With a system according to the present invention the video screen functioning as a communication medium will rapidly and clearly present to the controlling person any relevant information. Such information comprises also stored or back-up information which may be in the form of figures, texts or pictures, for instance charts electronically stored in the bulk storage. The controlling person acts as the user of the interactive switching center provided by the screen instead of himself constituting said switching center an was previously the case. The information presented or selected on the video screen of the command vehicle can be transmitted at high speed via the same communication medium to all locations of the corresponding systems of a formation, for instance also automatically or semi-automatically via radio data transmission, and can be updated externally.

The present invention also intends to provide an operating and display apparatus for rapidly, accurately and comprehensively informing one or more controlling persons and for permitting quick reactions via the operating side in case of complex situations.

Due to the arrangement of two separate video screens and of the key field or fields in a control panel situated in the field of view of the controlling person(s), an operating and display apparatus in accordance with the present invention provides an operator with a particularly good overall view of all operationally relevant data, offering corresponding choice of any groups of data which are of special current interest while enabling control thereof by the operation of selected keys.

In an operating and display apparatus of the present invention the command computer, which was previously used only as an auxiliary means, is now the core component which presents the processed data in clear configuration on the two video screens in accordance with the controlling person's choice.

Initially, the controlling person makes a choice by selecting either a chart display or an enlarged image of the environment on the first screen. By operation of various keys in the key fields it is also possible to select certain menus according to which additional information can be overlaid on the video screen images or the video screen images can be enlarged or shifted or the like.

Thus, menus of information chosen by the controlling person himself are clearly presented, i.e. an overall presentation of every possible kind of information is intentionally not provided. The controlling person is thereby enabled to recognize the current situation in a simpler and hence more rapid way and to find a decision more easily while he may react quickly via the operating side, for instance by transmitting proper commands to vehicles of the formation for directing and operating equipment such as a weapon, a fire fighting device or the like, for changing the course of his own vehicle and the like.

The operating and display apparatus is particularly advantageous when all vehicles of a vehicle formation are in use. However, the controlling person is also considerably relieved due to the processing and display of the information on the operating and display apparatus of the invention when only a single vehicle is equipped with said apparatus.

In a preferred embodiment of the system in accordance with the present invention the video screen is touch-sensitive so that the displayed image may be supplemented or changed for example by touching with the fingers, e.g. symbols may be set in the picture on the video screen, the image may be shifted in the desired direction by passing the fingers across the video screen, and the like.

This is particularly advantageous when an electronically stored chart or a chart section is displayed in a main image field of the video screen. Like an actual chart, the chart display may be shifted as described across the video screen so that previously invisible sections will be presented to the commander's field of view.

Preferentially, different scales may be selected for the image displayed on the video screen. It is also advantageous when different displays can be overlaid such as either a chart display or an enlarged detail of the surroundings in the main image field and a panoramic view of the surroundings in another image field. For practical purposes, said further image field may preferentially be displayed on three separate video screens each of which shows a 60° azimuthal section of the surroundings.

The video screen may co-operate with a field for status display and a programmable function key field by means of which a main image field/chart display correlation or a panoramic view/detailed view correlation may be established by superimposing a marker in the panoramic view and corresponding imaging in the chart display or in the detailed display, respectively. It is also possible by key depression and subsequent touching with the fingers to met symbols in the main image field for representing the own position including the orientation and direction of sight of the enlarging sensor in the image. All of these features considerably facilitate orientation for the controlling personnel and shorten the time for finding controlling decisions.

Hereinbelow, embodiments of the invention will be explained in detail with reference to schematic drawings, in which.

Figure 2:
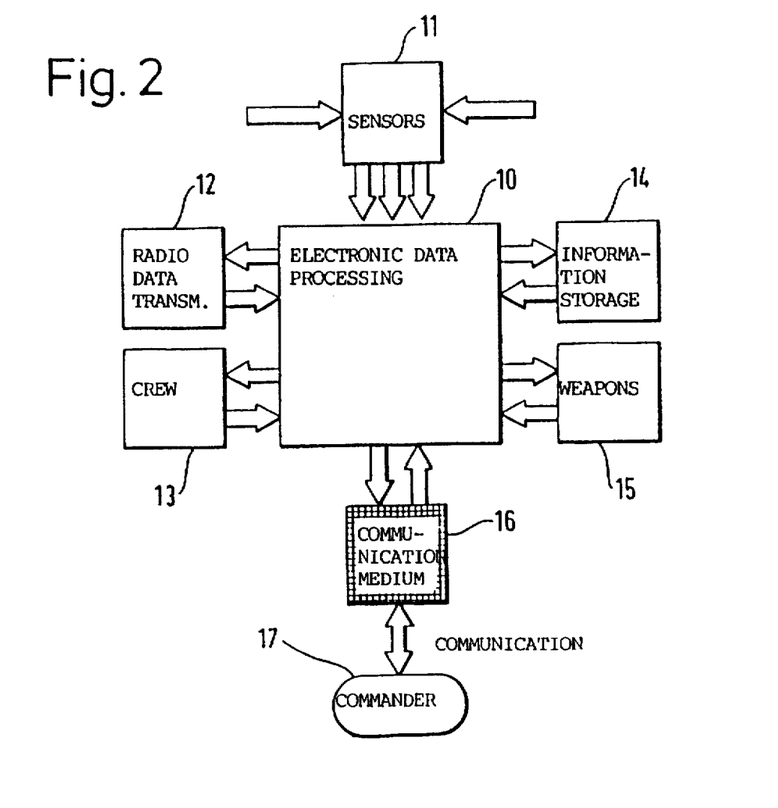
FIG. 2 in a schematic diagram of a system in accordance with the instant invention.

FIG. 2 illustrates by means of symbols the configuration of the essential elements of a system of the instant invention. Around a central square 10 there are grouped blocks 11, 12, 13, 14, 15 which contain (in the same order) sensors, radio data transmission, crew, information storage, weapons system. The central square 10 symbolizes an electronic data processing unit. This unit is in data exchange (indicated by oppositely directed arrows) with the components 11 to 15 and with a further block 16. This cross-hatched block 16 symbolizes a communication medium such as an interactive video display terminal or VDT.

The controlling person such as the commander no longer sits in the middle—as with the conventional configuration illustrated in FIG. 1—as a "switching center" for receiving, processing, transferring and decision finding but he makes use of the uniform communication medium (video screen or video terminal) 16 as an interactive switching center which offers that—and only that—information which is relevant for controlling the vehicle or a vehicle formation. Stored information (figures, texts, chart images and the like) is electronically stored in block 14. Therefore, such stored information can simultaneously be made available in image form via one and the same communication medium 16 in corresponding systems of other vehicles. Furthermore, via radio data transmission such information can be exchanged either automatically or semi-automatically and externally updated. It is thereby possible to achieve the following features:

the controlling personnel is relieved from secondary tasks such as position finding, position and status transmission and verbal acceptance of position information, the information transmission and information processing times are shortened, orientation and mobility of the vehicle/vehicle formation on the ground are improved, and information regarding the locations of own and strange forces are available at all control levels practically without delay.

Figure 3:
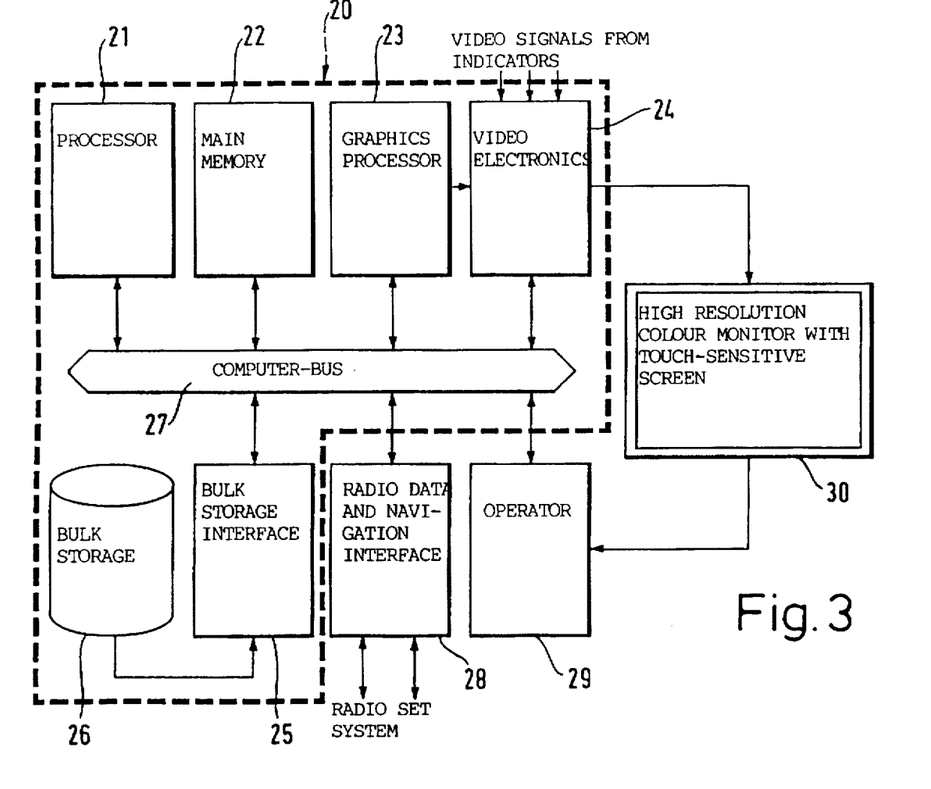
FIG. 3 is a block diagram of a system in accordance with the invention.

In the block diagram of FIG. 3 the necessary basic components of a system of the present invention which cannot be dispensed with in any case of application are framed by a dashed line and referenced 20. Hereinbelow, these basic components will be called the "core". Said core 20 comprises the processor 21 of a command computer, a main memory 22, a graphics processor 23, video electronics 24 and a bulk storage interface 25 with a bulk storage 26 and, finally, a computer bus 27 through which the specified components are in data exchange with each other.

In addition to the thus formed core 20 the embodiment of FIG. 3 also comprises the radio data and navigation interface 28, the operating interface 29 and interactive video display terminal 30 with high-resolution colour monitor including a high-resolution, touch-sensitive screen.

Figure 4:
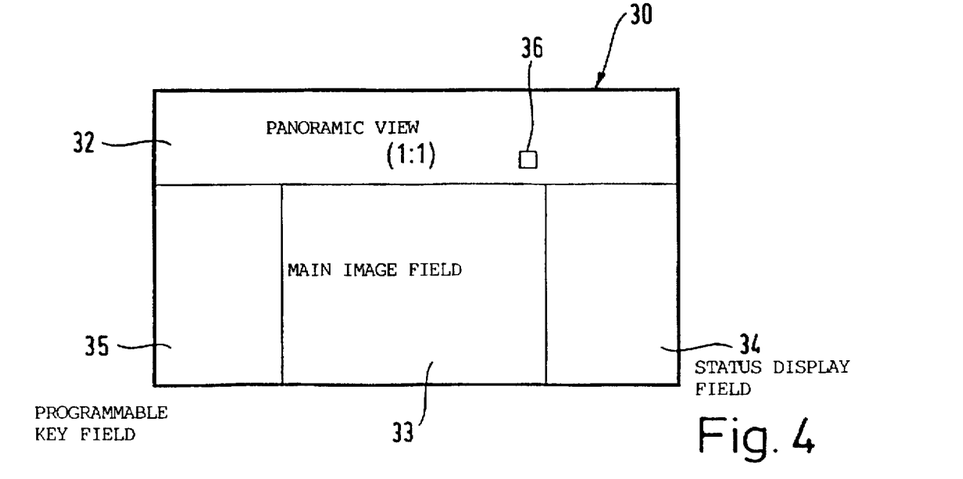
FIG. 4 is a schematic diagram illustrating the screen division of the video screen in a system according to the instant invention.

FIG. 4 illustrates a particularly useful division of the video screen 30 into a main image field 33, a panoramic view field 32 on top thereof and two side fields 34, 35 for status display and for a programmable key field.

It is possible, for example, to display in the main image field 33 a chart or a chart section (can be fetched from the bulk storage 26) in succession and at different scales. Instead, it is also possible to display a detailed image of the surroundings which has been obtained, for instance, with an enlarging indicator.

By finger touch it is possible to set and shift marks in the main image field 33 which are, for instance, characteristic of position and orientation of the or a vehicle of a vehicle formation. By passing the fingers across the screen in a given direction it is possible to "move" other chart sections into the image on the screen so that previously not visible sections of the chart will come into the field of view of the controlling person. The panoramic view field 32, for instance, contains a natural-size panoramic view display of the surroundings obtained by electro-optical corner reflectors. In one embodiment of the invention three images are displayed side-by-side, each covering adjacent 60° (azimuthal) sections of the surroundings. It is also possible to display these sections on a total of three separate VDT's or video screens.

The desired functions may be chosen selectively either through the key field and/or by finger touch. Also, setting or shifting of a mark on the screen is possible by means of a cursor or a joystick. Combined control by touch or by cursor/joystick operation is also possible.

For chart work, digitalized chart material can be displayed on the screen for instance at a scale of 1:50,000 and 1:250,000. A portion of the digitalized chart is available in the main memory 22, and the video screen 30 may also display only a section from the content of the main memory. Initially, the video screen section can be shifted by finger touch (or cursor) to all cardinal points until the edge of the chart portion filed in the main memory 22 is reached. When a section is desired which is outside of the main memory area, chart data from the bulk storage 26 are reloaded, which takes place within a few seconds. Thereafter, the newly loaded chart portion can be operated as described.

For changing from the larger scale to the smaller scale the position of the desired chart section can be displayed via a frame 36 on the video screen. This frame 36 designates the section of terrain currently aimed at by the enlarging sensor. The frame may be shifted by means of a finger or cursor to the desired chart detail, and when the finger is raised or a "detailed image" key is actuated the desired chart section will appear in the main image field 33 where the line of sight of the enlarging sensor may be represented by a straight line. Then, the actual interactive work with the chart can be performed.

Alternatively, the section of terrain designated by the frame 36 may be displayed at an enlarged scale in the main image field.

The fact that every picture element of the chart in the video screen image is clearly defined with respect to its graphic coordinates permits rapid and simple determination of any desired coordinates. To this end it is merely necessary to select the position to be determined by cursor or finger, whereupon the north and east values can be read in a text field on the screen in UTM grid coordinates.

To set a symbol such as for a vehicle in the chart display, the commander may depress the "vehicle" key in the key field 35 and transfer the symbol, which as it were "adheres" to his finger, onto the chart image in the main image field 33 by touching the screen at the desired position. When the own position is concerned it is possible due to the panoramic view/chart display correlation to display the own vehicle direction and the line of sight of the enlarging sensor.

To verify and update the own position one may drive the vehicle to a defined location in the terrain, e.g. a cross-roads, and mark the location in the chart on the video screen. The then indicated values may either be inputted manually into a conventional vehicle navigation system or in case of suitable communication can be transferred directly by key depression. The continuous updating of the own position is then performed by the navigation system of the vehicle which also supplies information about the automatic positional and directional representation of the own vehicle on the video screen.

Knowledge of the own position of the vehicle direction and the VDT or weapon angle as well as the current representation on the chart permits very easily to preset from the chart the observation, target or weapon direction. For example, when the observation direction of a critical piece of terrain known from the chart is required, the said location need only be marked on the panoramic view field 32 whereupon an enlarging indicator is automatically turned to the inertial direction, i.e. the correct direction relative to the terrain. For clarification, the marked piece of terrain can be designated on the chart display in the main image field 33, and the direction of observation determined therefrom may be represented by the mentioned straight line.

The combination of chart display and visual display on the video screen 30 offers the possibility of superimposing information (especially of a graphic type) on the respective other display. Thus, in the chart display a set vehicle symbol may be supplemented by additional information such as turret/weapon position, gunsight direction, line of sight of an optical and electro-optical sensor or line of sight of an enlarging indicator. Such additional information may be overlaid, for instance, in the form of coloured short dashes and acute-angled triangles for designating the line of sight or the like, wherein the individual elements are shiftable together with the vehicle symbol and can mutually be turned as desired about the angles corresponding to the actual situation. This is done by continual automatic sensing of the angles with corresponding position sensors (not illustrated) and transfer to the processor 21 which then generates the corresponding graphics. Hence, the commander of the vehicle may see at a glance what directions are adopted by the individual devices of the own vehicle or the friendly vehicles of a formation and how they are positioned relative to each other. Conversely, in order to recognize and geographically associate the own position relative to a critical piece of terrain by means of the display device, one glance at the chart will be sufficient to mark the direction of said piece of terrain relative to the own position.

The symbols for directional allocation may partly also be used to be superimposed on the image field of the display device so that the allocation of the device means is clearly apparent even when no chart is displayed on the video screen 30.

In the mode of operation in which the video screen displays exclusively visual images of the surroundings, i.e. does not display any charts, additional information may be superimposed on the visual images for better orientation. The already mentioned frame 36 is a good aid; it is superimposed on the panoramic image obtained from an electro-optical corner reflector and exactly marks the section which is sensed by an enlarging sensor or indicator and displayed in the main image field 33. Together with the movement of the display device the frame 36 is also moved so that the surrounding field can easily be observed in the overall visual display while details are visualized either in the main image field or on a further monitor. This function may also be used for turning the display device to a desired direction by means of the joystick or by touch—in case of use of the touch-sensitive video screen—and then observing the enlarged image section in the main image field.

When the direction of view of the VDT is outside of the area that is sensed by the optical or electro-optical sensor (corner reflector) the frame 36 cannot be superimposed. However, in this case the direction of the VDT may be characterized by an arrow or an acute-angled triangle like the pointer of a clock, wherein the noon position corresponds exactly to the center direction of the electro-optical corner reflector.

Use of the interactive video screen 30 for displaying in the main image field 33 an image of the surroundings which has been generated by an enlarging indicator offers the possibility of direct setting of a device by marking a target point on the video screen. In this mode of operation, when a finger touches a point on the screen which is to be sighted and which is outside of the image center, setting of the selected device to said direction is automatically triggered. Subsequently, the marked object will immediately appear in the center of the image.

Also, the interactive video screen 30 with its programmable key field may be used for selecting non-typical functions such as normal firing control functions.

A further important control aid results from the fact that, as described above, the commander can store in a chart display additional data such as the own position, the position of strange vehicles and enemy vehicles in the form of so-called overlays, i.e. memory layers superimposed on the basic memory contents, and may retrieve, update and restore such information as desired.

Figure 5:
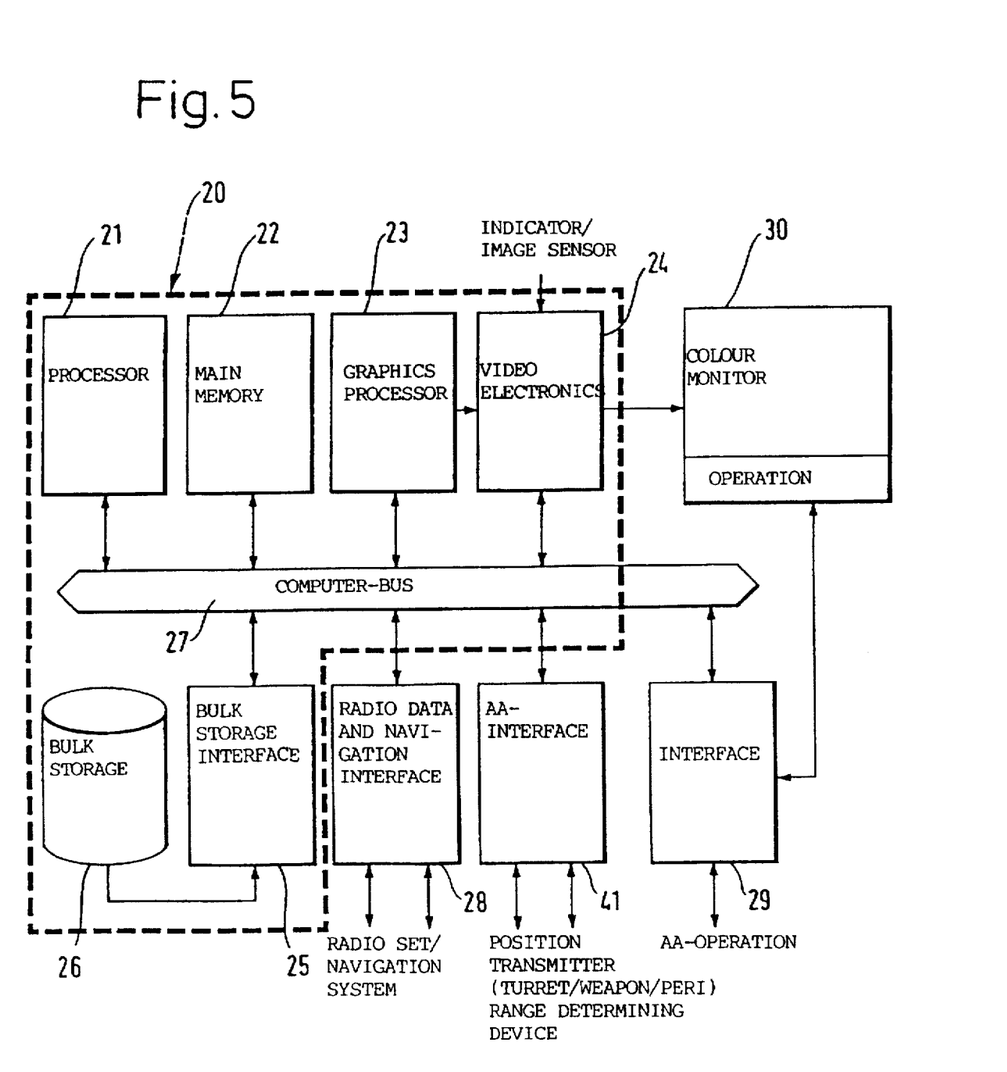
FIGS. 5 and 6 are block diagrams of modified systems in accordance with the invention.
Figure 6:
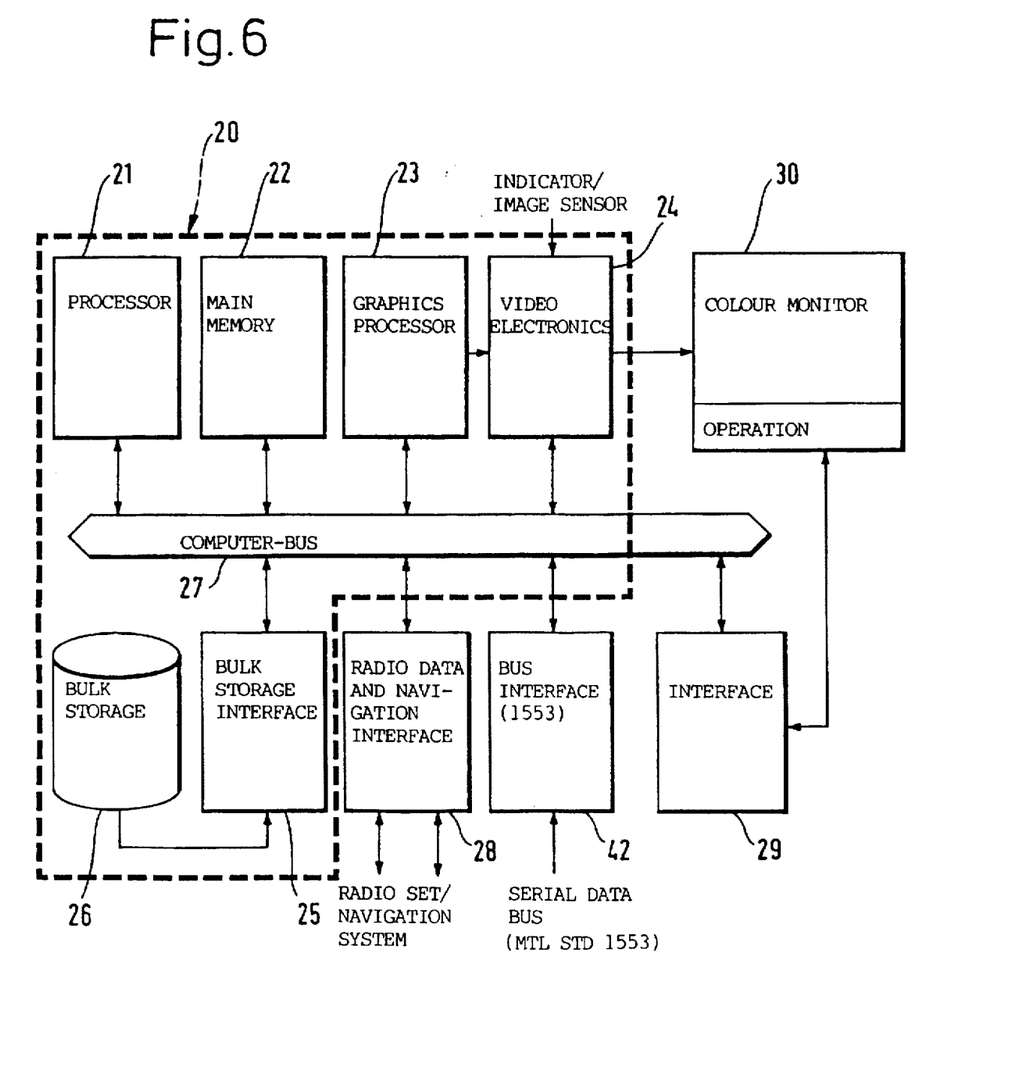

In the embodiments illustrated in FIGS. 5 and 6 similar components have been given the same numerals as in FIG. 3. Particularly the core 20 of the command computer with its discrete components 21 to 27 corresponds to the core 20 shown in FIG. 3. Furthermore, the configurations shown in FIGS. 5 and 6 are also provided with a radio data transmission and navigation interface 28 for communication with the radio set/navigation system.

FIG. 5 shows the system according to the present invention for connection to a centrally set-up firing control system with an additional interface 41 for position transmitters and range finders mounted on the vehicle. When the system to which the apparatus of the invention is to be adapted already comprises a serial data bus, a universal bus interface 42 for connection to the serial data bus is provided in addition to the mentioned transmitters of FIG. 5 and replaces the direct interface 41. In the embodiments of FIGS. 5 and 6 the basic structure of the components: video screen or colour monitor 30 and interface 29 for connection to the computer bus 27 is the same as in the embodiment of FIG. 3.

The embodiments of FIGS. 5 and 6 are alternatives for use in a fighting vehicle.

EP 0 411 480 A2 discloses a test stand which is designed as an insert in the turret opening of an armoured vehicle body. Among other things, such a test stand is also suited for testing a system according to the instant invention and initially offers the possibility of providing system equipment in excess of that which can later be integrated in a standard vehicle. In view of the complexity of the system of the invention it is necessary to have experimental results available so that in a later concrete vehicle equipment any necessary reductions will be made where appropriate. To this end the test stand is provided whose details are disclosed in EP 0 411 480 A2.

Figure 7:
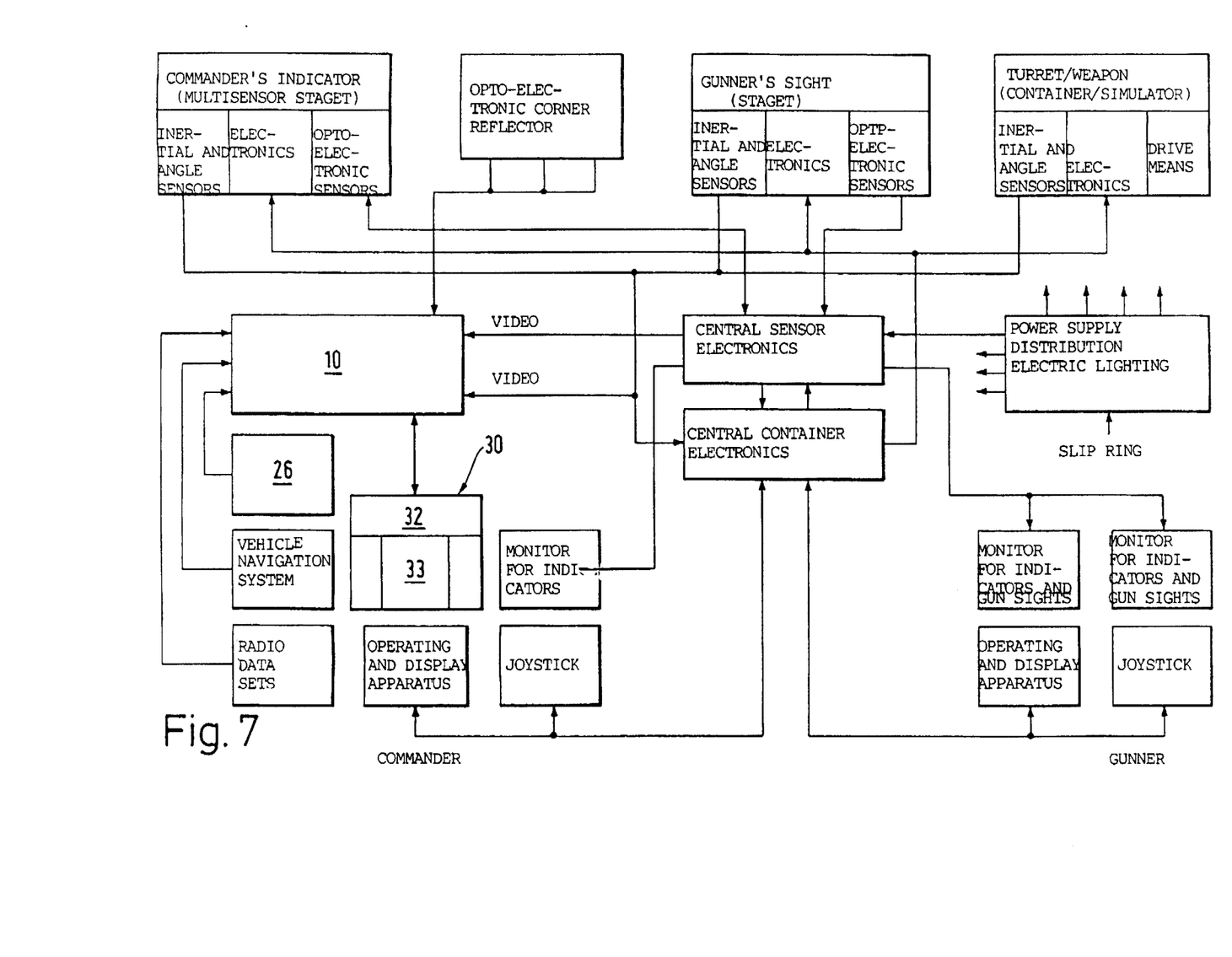
FIG. 7 is a block diagram of a system according to the invention as used in a test stand or a fighting vehicle, respectively.

FIG. 7 is an example for the incorporation of a system according to the present invention, which is referenced 10 as in FIG. 2 and comprises a high-resolution video screen 30 as in FIG. 2, in the overall system provided in the test stand. The boxes bearing legends are known per se as regards their construction and function. The cooperation of these components with the numerals 10, 26, 30, 32, 33 of the system according to the invention will be apparent to the skilled man from FIG. 7.

Analogously, but with modifications adapted to the respective tasks, an overall system for equipping an actual vehicle such as a fighting tank, an anti-aircraft tank and the like can be constructed; this is within the scope of the skilled man's knowledge.

Figure 8:
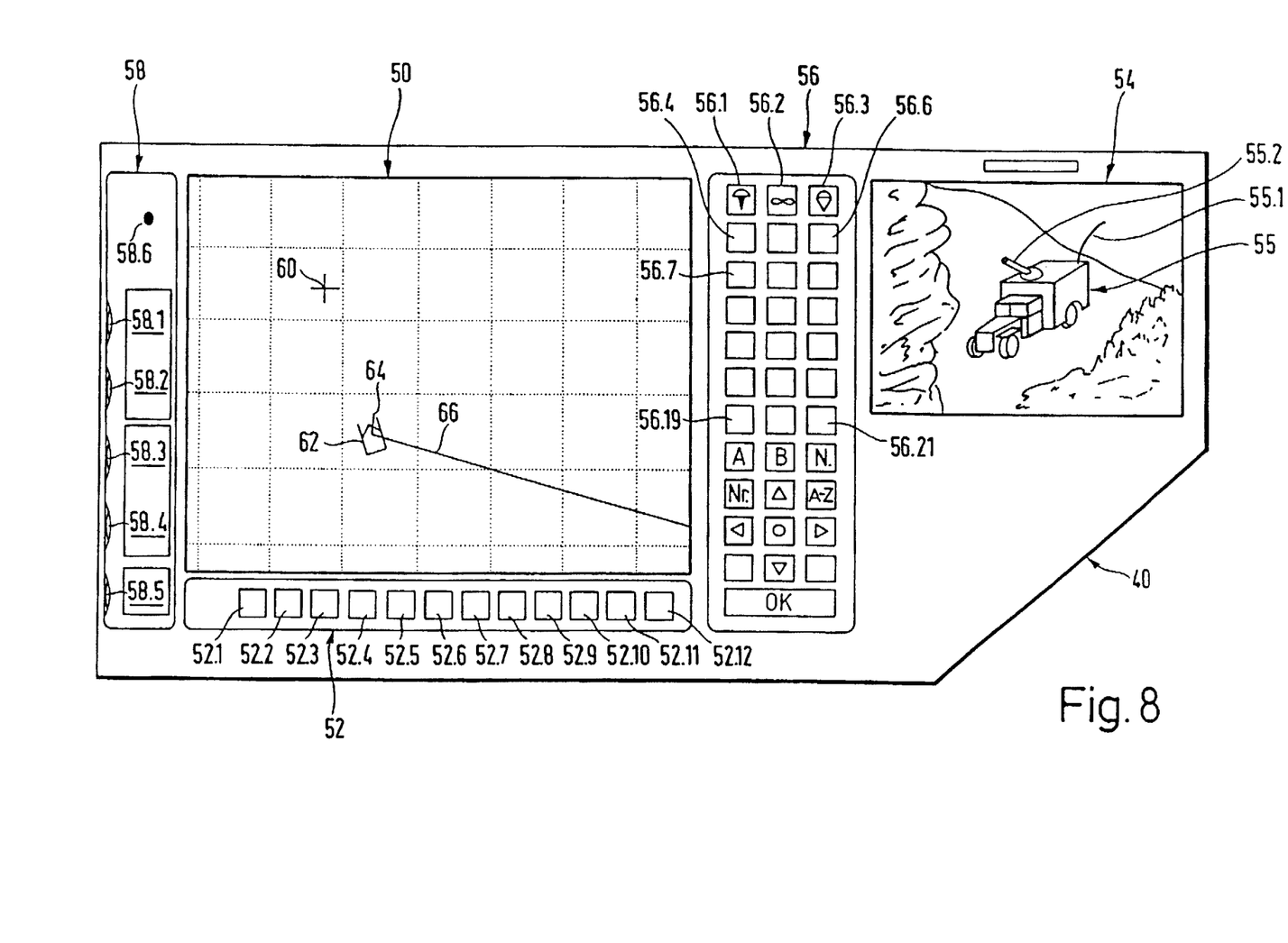
FIG. 8 is a plan view of an operating and display apparatus in accordance with the instant invention.

FIG. 8 is an overall representation of the operating and display console of an apparatus according to the present invention.

The figure illustrates a particularly useful subdivision of the operator console 40 as implemented in the present invention. 50 is a high-resolution colour video screen for selectively displaying a chart, which is either generated from data fetched from a data storage (not illustrated) by a non-illustrated command computer or generated by a sensor which is preferentially mounted on the vehicle, for supplying an enlarged partial display of the surroundings. Furthermore, 52 is a main key field below the screen including a number of horizontally disposed fixed-allocation keys, 54 is a video screen for selectively displaying various kinds of sensor information from the surroundings, 56 is a multi-function key field, and 58 is a monitor operating field.

The functions to be executed with the fixed-allocation keys 52.1 to 52.12 of the main function key field 52 are described as follows. Preferentially the keys 52.1 to 52.12 of the main function key field 52 have the following functions allocated to them;

Key 52.1 has the function of chart-related control of a sensor support relative to its orientation to the vehicle.

Key 52.2 has the function of switching the image back to the first video screen 50.

Key 52.3 has the function of shifting the chart on the first video screen 50.

Key 52.4 has the function of selecting the chart scale.

Key 52.5 has the function of chart selection.

Key 52.6 allows a storage manipulation.

Key 52.7 is used to acknowledge received information.

Key 52.8 has the function of transmitting to participants in a first radio circuit.

Key 52.9 has the function of transmitting to participants in a second radio circuit.

Key 52.10 has the function "status/information" and is used for determining the distributors.

Key 52.11 allows erasing of symbols or complete position storages.

Key 52.12 has the function "cancel/abort".

The multi-function key field 56 comprises keys for fixed allocations. Thus, the keys 56.1, 56.2 and 56.3 preferentially have the function of providing an alarm in case of different threats. The keys indicated at A, B and N have the function of switching from storage A, B and "scratchpad". The keys bearing the symbols Nr. and A–Z have the functions "select number input" and "select alphabetic input". The four keys bearing the arrow symbols have the function of moving the cross-hair cursor 60 on the first video screen 50. The key which bears a circle and is disposed in the center of the keys bearing arrows is used for confirming the position of the cross-hair cursor 60 (push function).

The keys 56.4 to 56.21 which bear no symbols are preferentially used for initiating different functions in accordance with the menu chosen via the key field 52.

The "OK" key is used to confirm an input.

The monitor operating field 58 includes a total of five rotary regulators, viz. two rotary regulators referenced 58.1 and 58.2 for regulating brightness and contrast of the images on the first video screen 50, two rotary regulators 58.3, 58.4 for regulating brightness and contrast of the image on the video screen 54, and one rotary regulator 58.5 for regulating the key brightness.

Also, an ON/OFF switch 58.6 is disposed in the monitor operating field.

In the multi-function key field 56 the keys 56.4 to 56.21 in FIG. 8 bear no symbols. Preferentially, these keys 56.4 to 56.21 are menu keys with variable allocations whereas the menu keys 52.1 to 52.12 in the main function key field 52 are menu keys with fixed allocations.

The image on the video screen 50 may be overlaid as illustrated with the own position and course direction by a vehicle symbol 62, with the direction 64 of a device mounted on the vehicle such as an indicator, a fire fighting gun, a weapon or the like, and with the direction 66 of a VDT of the controlling person; all of this should be imagined on the background of a section of a geographical chart which is not illustrated in FIG. 8.

As an alternative, the video screen 50 may show an enlarged section display of the surroundings of the panoramic image of the video screen 54, which represents a fire vehicle 55 including an antenna 55.1 and a fire fighting gun 55.2.

The image on the video screen 50 can be overlaid with alphanumeric and graphic information for determining, for instance, the allocation of the keys 56.4 to 56.21 in the right-hand portion by symbols in the image. Also, it is preferred to superimpose current status information in the lower right-hand portion.

The described arrangement comprising the two video screens 50 and 54 enables the controlling person to obtain a direct, immediate and—due to the various selectable displays on the video screens—comprehensive overall view of the entire events of interest in the area represented by the images on the video screen and permits immediate, multiple actions via the key fields 52 and 56.

We claim:

1. A method for coordinating and controlling a plurality of units comprising a group comprising the steps of:
   (a) providing chart information;
   (b) providing a main image display;
   (c) visually displaying chart information surrounding a unit on a main image display;
   (d) receiving from a second unit in the group information regarding (i) the position of the second unit, (ii) the orientation of a sensor carried by the second unit and (iii) data from the sensor of the second unit;
   (e) superimposing on the chart information displayed on the main image display (i) the position of the second unit, (ii) the orientation of the second unit sensor, and (iii) data from the second unit sensor; and
   (f) coordinating and controlling the group responsively to the main image display.

2. The method of claim 1 wherein the sensor data includes information regarding the identification of an object sensed and its position.

3. The method of claim 2 wherein the sensor data includes an image; and
   including the further step of selectively displaying the sensor image on the main image display.

4. The method of claim 3 wherein the image is visual.

5. The method of claim 3 wherein the image is an infrared image.

6. The method of claim 2 wherein the sensor data includes an image; and including the further steps of:
   (g) providing a second image display; and
   (h) selectively displaying the image on the second display.

7. The method of claim 1 wherein the sensor data includes an image; and including the further step of:
   (g) selectively displaying the sensor image on the main image display.

8. The method of claim 7 wherein the image is visual.

9. The method of claim 7 wherein the image is infrared.

10. The method of claim 1 including the step of storing chart information; and
    providing the chart information from storage.

11. The method of claim 1 including the step of sensing chart information; and
    providing the chart information from the sensor.

12. A system for coordinating and controlling a plurality of units comprising a group comprising:
    (a) means for providing chart information;
    (b) means for providing a main image display;
    (c) means for visually displaying chart information surrounding a unit on a main image display;
    (d) means for receiving from a second unit in the group information regarding (i) the position of the second unit, (ii) the orientation of a sensor carried by the second unit and (iii) data from the sensor of the second unit;
    (e) means for superimposing on the chart information displayed on the main image display (i) the position of the second unit, (ii) the orientation of the second unit sensor, and (iii) data from the second unit sensor; and
    (f) means for coordinating and controlling the group responsively to the main image display.

13. A system for coordinating and controlling a plurality of units comprising a group comprising the steps of:
    (a) means for providing chart information to a control unit;
    (b) means for providing a main image display carried by the control unit;
    (c) means for determining the position of the control unit;
    (d) means for visually displaying chart information surrounding the control unit on a main image display carried by the control unit;
    (e) means for providing a selectively orientated sensor carried by the control unit;
    (f) means for displaying on the main image display information regarding (i) the position of the control unit, (ii) the orientation of the control unit sensor and (iii) data from the sensor; and
    (g) means for coordinating and controlling the group responsively to the main image display.

14. A system for the interactive control of a plurality of vehicles fighting as a group, each of said vehicles comprising:
    a command computer including a processor, a main memory, and a storage means for geographical maps;
    a first sensor for producing an enlarged image section of the surroundings;
    a second sensor for producing a panoramic image of the surroundings;
    a wireless data connection for transmitting and receiving information; and an operating and display device having (i) a first means for selectively visually displaying geographical maps or the enlarged image sections, (ii) a second means for visually displaying the panoramic image, and (iii) at least one key field having keys the actuation of which overlays additional information onto the images visually displayed.

15. In a system for interactively controlling a vehicle formation in which each vehicle includes (i) a command computer including a processor and a main memory, (ii) a data storage means containing information from which geographical chart displays may be composed and/or by means of which positional displays related to a situation may be generated, (iii) first and second sensors for obtaining information from the surroundings of the vehicle, and (iv) radio data connection means for transmitting and receiving information, the improvement comprising a display apparatus which comprises:

a first video screen for selectively displaying either geographical data from said data storage means or an enlarged image section of the surroundings of the vehicle as produced by said first sensor;

a second video screen for displaying a panoramic image of the surroundings of the vehicle as produced by said second sensor; and at least one key field including fixed-allocation keys and variable-allocation keys in which the images of said first and second video screens may be selectively influenced by actuation of at least one key and/or by information received by said radio data connection.

16. The display apparatus of claim 15 including means for positioning said two video screens adjacent each other.

17. The display apparatus of claim 15 including a multi-function key field disposed intermediate said two video screens, said key field comprising multi-allocation menu keys, fixed-allocation keys and keys for controlling a cursor.

18. The display apparatus of claim 15 including a main function key field disposed below said first video screen in the form of a horizontal row of fixed-allocation menu keys.

19. A system for interactively controlling vehicles of a vehicle formation including means adapted to be carried by each vehicle in the formation, said means comprising:

(a) means for receiving: (i) stored information, (ii) information obtained by a selectively oriented sensor from the surroundings, (iii) information received by radio data transmission, and (iv) information concerning the condition of components of the vehicles in the formation;

(b) communication means for transmitting and receiving information to and from other vehicles in the vehicle formation;

(c) means for initiating functions;

(d) a digital command computer operatively connected to said receiving means, communication means and function initiating means, said computer having a processor and a main memory and a navigation system, said command computer further comprising (i) a graphics processor, (ii) video electronics, (iii) a bulk storage interface with a bulk storage, and (iv) at least one video screen through which all of the sensed, stored and received information in the form of electronic data relating to one or more of the vehicles in the formation may be selectively displayed;

(e) a key field for status indications; and (f) a function key field, said key and function key fields being associated with said video screen whereby the video screen image may be influenced by the selective actuation of a key of said key fields to display on said video screen the position and the orientation of the sensor of at least one of the vehicles in the formation.

20. The system of claim 19 in which said video screen is touch-sensitive so that supplements and/or changes in the screen image may be selectively generated by finger touch.

21. The system of claim 20 in which the image on said video screen may be selectively shifted in a selected direction by the passage of fingers across said video screen in proximity thereto in the selected direction.

22. The system of claim 20 wherein the keys of the function key field bear symbols each of which may be selectively transferred onto the image on said video screen by finger-actuation of a predetermined key and subsequent touching of said touch-sensitive video screen.

23. The system of claim 19 wherein said at least one video screen includes (a) a main image field for display of graphics including at least one of (i) a portion of a chart from said bulk storage or (ii) a detailed view of the surroundings of the vehicle obtained by an enlarging sensor (indicator device), and (b) panoramic image field for displaying a panoramic image of the surroundings of the vehicle obtained by an optical sensor.

24. The system of claim 23 wherein said optical sensor includes an opto-electronic corner reflector.

25. The system of claim 23 wherein the displayed graphics in said main image field may be selectively displayed at different scales.

26. The system of claim 23 wherein said main image field is touch-sensitive so that (i) supplements and/or changes in said graphics may be selectively displayed in said main image field by finger touch and (ii) said graphics can be shifted in said main image field by passing the fingers thereacross in proximity thereto to automatically display graphics related to the shifted display.

27. The system of claim 26 wherein the display of graphics display in said main image field as the result of any shift is continuous.

28. The system of claim 26 wherein the keys of said function key field bear symbols each of which may be selectively transferred onto the image on said at least one video screen by finger-actuation of a corresponding key and subsequent touching of said at least one video screen.

29. The system of claim 23 wherein said at least one video screen is a high-resolution, colored screen; and wherein the graphics displayed in said main image field are displayed in color.

30. The system of claim 23 including means for establishing a panoramic view/chart display correlation (i) by displaying in the panoramic image a mark for designating the image section on which the enlarging sensor is to be sighted and (ii) by displaying a direction beam in the chart image with an angular orientation indication of the current azimuthal direction angle of the enlarging sensor.

31. The system of claim 23 including means for establishing a panoramic image/detailed image correlation (i) by displaying in the panoramic image a frame for designating the image section on which the enlarging sensor is to be sighted and (ii) by displaying in said main image field the designated image section defined by said frame in the panoramic image.

32. The system of claim 31 wherein said bulk storage includes data for changes of situational changes in one or more superimposed overlays in addition to basic data relating to charts.

33. The system of claim 19 wherein said bulk storage includes data for changes of situational changes in one or more superimposed overlays in addition to basic data relating to charts.

34. The system of claim 19 wherein said information received by radio transmission includes the identification and position of an object sensed by said sensor; and wherein the selective actuation of a key of said key fields influences the video screen image to display the identification and position of the sensed object.

35. The system of claim 34 wherein the information transmitted and received by said communication means includes the image of the sensed object.

36. The system of claim 19 wherein said sensor includes at least one of an optical and opto-electrical sensor.

37. A method for coordinating and controlling a plurality of units comprising a group, each of the units having a selectively oriented sensor, by providing interactive visual information to personnel at each unit to enhance the speed and accuracy with which decisions may be made by such personnel, the method comprising for each unit the steps of:

a) determining unit position, sensor orientation, and sensed information;

b) transmitting unit position, sensor orientation and sensed information to other units;

c) receiving information transmitted from the other units regarding the position thereof, the orientation of the sensor thereof and the information sensed;

d) processing the received unit position information to determine the relative position of the other units;

e) displaying visually the position of at least one of the plurality of units; and f) displaying the orientation of the sensor of the unit whose position is displayed and at least some of the sensed information.

38. The method of claim 37 wherein the sensed information includes the identification and position of an object sensed by the sensor.

39. The method of claim 37 wherein the sensed information is a video image; and including the further step of:

selectively displaying the video image.

40. The method of claim 37 comprising the further steps of:

g) sensing the surroundings of the unit and the status of unit devices;

h) determining unit orientation relative to the surroundings; and i) transmitting information relating to unit surroundings, device status, and unit orientation to the other units.

41. The method of claim 37 comprising the further step of:

g) receiving information relating to
  (i) the surroundings of the other units and the status of the other unit devices, and
  (ii) the orientation relative to the surroundings of the other units; and h) graphically displaying the received information relating to the surroundings and the orientation of the other units.

42. The method of claim 37 wherein the units are carried by armored land vehicles.

43. A method for coordinating and controlling a plurality of units comprising a group comprising the steps of:

(a) providing chart information to a control unit;

(b) providing a main image display carried by the control unit;

(c) determining the position of the control unit;

(d) visually displaying chart information surrounding the control unit on a main image display carried by the control unit;

(e) providing a selectively orientated sensor carried by the control unit;

(f) displaying on the main image display information regarding (i) the position of the control unit, (ii) the orientation of the control unit sensor and (iii) data from the sensor; and (g) coordinating and controlling the group responsively to the main image display.

44. The method of claim 43 wherein the sensor data includes an image; and including the further step of selectively displaying the sensed image on the main image display.

45. The method of claim 44 including the further steps of:

(h) providing a second image display; and (i) selectively displaying the sensed image on the second display.

46. The method of claim 43 including the step of communicating (i) the position of the control unit, (ii) the orientation of the control unit sensor, and (iii) the sensor information to at least one other unit.

* * * * *